US012697278B2

(12) United States Patent
Nakano

(10) Patent No.: US 12,697,278 B2
(45) Date of Patent: Aug. 4, 2026

(54) PRESSURE BAG

(71) Applicant: JMS Co., Ltd., Hiroshima (JP)

(72) Inventor: Kiyomi Nakano, Hiroshima (JP)

(73) Assignee: JMS Co., Ltd., Hiroshima (JP)

( * ) Notice: Subject to any disclaimer, the term of this patent is extended or adjusted under 35 U.S.C. 154(b) by 593 days.

(21) Appl. No.: 18/252,736

(22) PCT Filed: Oct. 7, 2021

(86) PCT No.: PCT/JP2021/037114
§ 371 (c)(1),
(2) Date: May 12, 2023

(87) PCT Pub. No.: WO2022/102293
PCT Pub. Date: May 19, 2022

(65) Prior Publication Data

US 2024/0000659 A1 Jan. 4, 2024

(30) Foreign Application Priority Data

Nov. 16, 2020 (JP) ................................ 2020-190490

(51) Int. Cl.
*A61M 5/148* (2006.01)
*A61J 1/10* (2006.01)

(52) U.S. Cl.
CPC ...................................... *A61J 1/10* (2013.01)

(58) Field of Classification Search
CPC .. A61J 1/1462; A61J 1/16; A61J 1/10; A61M 5/148; A61M 5/1483; A61M 5/155;
(Continued)

(56) References Cited

U.S. PATENT DOCUMENTS 3,153,414 A * 10/1964 Beall .................... A61M 5/155
604/262
5,013,303 A 5/1991 Tamari et al.
(Continued)

FOREIGN PATENT DOCUMENTS

CN 102076480 5/2011
CN 102510830 6/2012
(Continued)

OTHER PUBLICATIONS

International Search Report issued in International Application No. PCT/JP2021/037114, Nov. 9, 2021, 6 pages w/translation.
(Continued)

*Primary Examiner* — Jason E Flick
(74) *Attorney, Agent, or Firm* — HSML P.C.

(57) ABSTRACT

A pressure bag (1) has a substantially rectangular shape in a plan view, and also has a bag-like shape with an opening (11) through which a bag-shaped container (50) is placed into and taken out of a housing chamber (10) in a first short side (13*a*) of the substantially rectangular shape. The pressure bag (1) has a double structure in which an inner sheet (20) and an outer sheet (30) are laid one on top of another so that the outer sheet (30) is located on the opposite side of the inner sheet (20) from the housing chamber (10). A pressure chamber (15) is provided between the inner sheet (20) and the outer sheet (30). The inner sheet (20), the outer sheet (30), and the pressure chamber (15) extend from one side to another side of the housing chamber (10) via a first long side (14*a*).

13 Claims, 9 Drawing Sheets

(58) Field of Classification Search
CPC .... B65D 83/62; B65D 83/771; B65D 75/008; Y10S 128/12
See application file for complete search history.

(56) References Cited

U.S. PATENT DOCUMENTS

| | | | |
|---|---|---|---|
| 5,505,708 | A | 4/1996 | Atkinson |
| 6,056,724 | A | 5/2000 | Lacroix |
| 2011/0259510 | A1 | 10/2011 | Foucaut et al. |
| 2012/0217180 | A1 | 8/2012 | Kurose et al. |
| 2013/0066294 | A1 | 3/2013 | Wake |
| 2016/0235627 | A1 | 8/2016 | Morimoto et al. |
| 2020/0095056 | A1 | 3/2020 | Nakano et al. |

FOREIGN PATENT DOCUMENTS

| | | |
|---|---|---|
| CN | 102989028 | 3/2013 |
| CN | 105722492 | 6/2016 |
| CN | 106364738 | 2/2017 |
| JP | 2007-029562 | 2/2007 |
| JP | 2011-019709 | 2/2011 |
| WO | 2018/181502 | 10/2018 |

OTHER PUBLICATIONS

Second Office Action issued in corresponding Chinese Patent Application No. 201880020585.X, Jul. 20, 2022, 12 pages w/translation.

* cited by examiner

PRESSURE BAG

TECHNICAL FIELD

The present invention relates to a pressure bag for applying pressure to a bag-shaped container in which a liquid substance is contained, and more particularly relates to a pressure bag that is used to apply pressure to the bag-shaped container and thereby squeeze the liquid substance out of the bag-shaped container.

BACKGROUND ART

Enteral nutrition therapy is known as a method for administering a liquid substance including a nutritional agent, a liquid diet, medicine, or the like to a patient where there are difficulties in feeding food from the oral cavity. In enteral nutrition therapy, a liquid substance that is contained in a bag-shaped container (also called “pouch”, “laminate pack”, or the like) formed by bonding flexible sheets to each other is fed into the body of a patient via a pliable catheter (commonly called “enteral nutrition catheter”). A nasal catheter that is inserted from the nasal cavity into the stomach or the duodenum of a patient, a PEG (Percutaneous Endoscopic Gastrostomy) catheter that is inserted into the stomach of a patient through a gastric fistula formed in the abdomen of the patient, and the like are known as catheters for use in enteral nutrition therapy.

If the liquid substance administered to the patient has a low viscosity, problems may arise, such as reflux of the liquid substance in the stomach to the esophagus occurring and causing pneumonia as a complication, or water in the liquid substance not being completely absorbed by the body and causing diarrhea. To prevent these problems, the liquid substance is often thickened to a high viscosity.

However, when a liquid substance is thickened to a high viscosity, the fluidity thereof decreases. In order to feed a liquid substance that is thickened to a high viscosity into the body of a patient, it is necessary to compress a bag-shaped container in which the liquid substance is contained. When attempting to perform this operation with bare hands, an extremely large force is required, and therefore, a considerable burden is imposed on a worker (for example, a nurse or a caregiver).

To address this issue, a squeezing device that is configured to be able to apply pressure to a bag-shaped container and squeeze a liquid substance out of the bag-shaped container has been used. Patent Document 1 discloses a squeezing device that applies pressure to a bag-shaped container using a pressure bag that inflates when injected with air. The pressure bag of the squeezing device has a substantially rectangular shape in a plan view. The pressure bag includes a housing chamber for housing a bag-shaped container, wherein an opening through which the bag-shaped container is placed into and taken out of the housing chamber is provided in one of the short sides of the substantially rectangular shape. The pressure bag has a double structure in which an inner sheet and an outer sheet are laid one on top of another. A pressure chamber into which air is injected is formed between the inner sheet and the outer sheet. All of the inner sheet, the outer sheet, and the pressure chamber extend from one side to another side of the housing chamber via a bottom portion (the other short side of the substantially rectangular shape) of the pressure bag.

CITATION LIST

Patent Documents

Patent Document 1: WO 2018/181502

DISCLOSURE OF INVENTION

Problem to be Solved by the Invention

The squeezing device of Patent Document 1 is generally used as follows. An enteral nutrition catheter is connected, via an extension tube, to a port provided in a bag-shaped container in which a liquid substance (for example, enteral nutritional agent) is contained. The extension tube is provided with a clamp. The clamp is closed at this time. The bag-shaped container is housed in the housing chamber of the pressure bag. Then, air is supplied to the pressure chamber using a manual pump. The pressure chamber inflates, and the bag-shaped container is compressed. When the pressure in the pressure chamber reaches a predetermined pressure level, the clamp is opened. The liquid substance contained in the bag-shaped container is supplied to a patient via the extension tube and the catheter. After the squeezing of the liquid substance out of the bag-shaped container is completed, the pressure in the pressure chamber is released, and the air in the pressure chamber is released to the outside. After the pressure bag is deflated, the bag-shaped container is taken out of the pressure bag.

The pressure bag of Patent Document 1 has a problem in that even when the pressure in the pressure chamber is released after the pressure bag is inflated, the air in the pressure chamber cannot be sufficiently released to the outside (or in other words, air release property is poor). When the air in the pressure chamber is not released from the pressure bag (or in other words, when the pressure bag remains inflated), the bag-shaped container cannot be taken out of the pressure bag. For this reason, the enteral nutrition therapy requires a long time.

An object of the present invention is to improve the air release property of a pressure bag in which a pressure chamber extends from one side to another side of a housing chamber.

Means for Solving Problem

A pressure bag according to the present invention includes a housing chamber for housing a bag-shaped container in which a liquid substance is contained and a hermetically-sealed pressure chamber. The pressure bag is configured such that when a fluid is injected into the pressure chamber, the pressure chamber is inflated and applies pressure to the bag-shaped container housed in the housing chamber, and thus the liquid substance can be squeezed out of the bag-shaped container. The pressure bag has a substantially rectangular shape in a plan view. The pressure bag has a bag-like shape with an opening through which the bag-shaped container is placed into and taken out of the housing chamber in a first short side of the substantially rectangular shape. The pressure bag has a double structure in which a flexible inner sheet and a flexible outer sheet are laid one on top of another so that the outer sheet is located on the opposite side of the inner sheet from the housing chamber. The pressure chamber is provided between the inner sheet and the outer sheet. All of the inner sheet, the outer sheet, and the pressure chamber between the inner sheet and the outer sheet extend from one side to another side of the housing chamber via a first long side of the substantially rectangular shape.

Effects of the Invention

According to the present invention, it is possible to provide a pressure bag with improved air release property.

DESCRIPTION OF THE INVENTION

Figure 1:
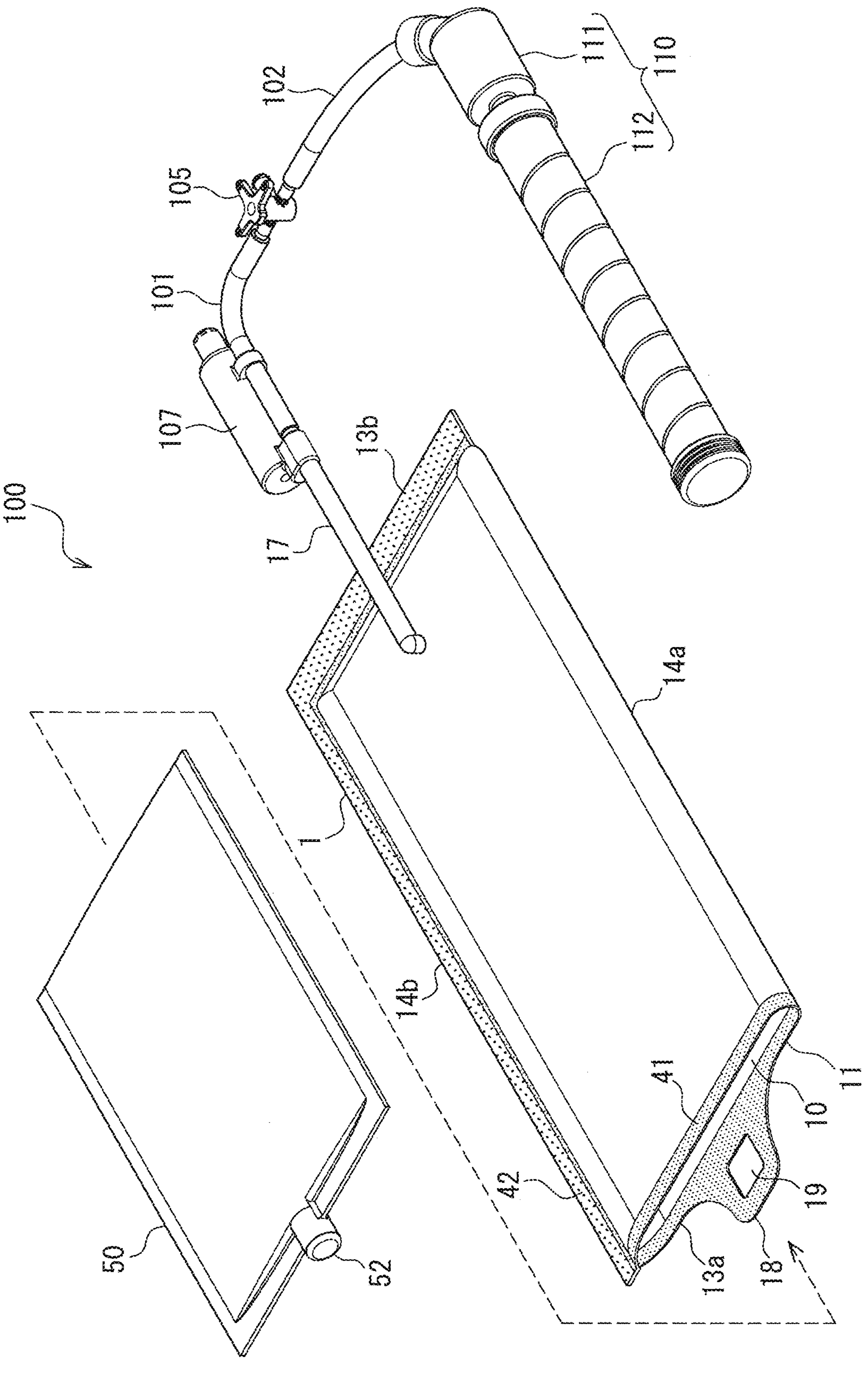
FIG. 1 is a perspective view of a squeezing device including a pressure bag according to an embodiment of the present invention.

According to a preferred aspect of the present invention, an inner sheet-to-outer sheet joining region in which the inner sheet and the outer sheet are laid one on top of the other and joined to each other may be provided along the first short side, a second long side, and a second short side of the substantially rectangular shape. An outer sheet-to-outer sheet joining region in which two layers of the outer sheet are laid one on top of another and joined to each other may be provided along the second long side and the second short side of the substantially rectangular shape. In the second long side and the second short side, the outer sheet-to-outer sheet joining region may be disposed on an outer side of the inner sheet-to-outer sheet joining region. With this aspect of the present invention, in the pressure bag, it is unnecessary to form a four-layer joining region in which a total of four sheet layers including two layers of the inner sheet and two layers of the outer sheet are laid one on top of another and joined to each other. This aspect of the present invention is advantageous in improving the airtightness and the joining strength of the sheet joining regions.

According to a preferred aspect of the present invention, the pressure bag may not include a four-layer joining region in which two layers of the inner sheet and two layers of the outer sheet are laid one on top of another and joined to each other. This aspect of the present invention is advantageous in improving the airtightness and the joining strength of the sheet joining regions.

According to a preferred aspect of the present invention, a joining region in which two or more layers of at least one of the inner sheet and the outer sheet are laid one on top of another and joined to each other may be provided along the second short side of the substantially rectangular shape. The joining region may have a width that is 8% or more of a length in a long-side direction of the pressure bag. This aspect of the present invention is advantageous in reducing the amount (liquid substance remaining amount) of the liquid substance remaining in the bag-shaped container after the liquid substance has been squeezed out of the bag-shaped container using the pressure bag.

According to a preferred aspect of the present invention, the pressure bag may further include a communicating tube that is in communication with the pressure chamber. With this aspect of the present invention, a fluid can easily flow into and out of the pressure chamber via the communicating tube, and the fluid in the pressure chamber can be easily discharged to the outside.

According to a preferred aspect of the present invention, the pressure chamber may include a first pressure chamber that is located on one side of the housing chamber and a second pressure chamber that is located on another side of the housing chamber. The communicating tube may be provided to be in communication with the first pressure chamber. With this aspect of the present invention, the effect of providing good air release property, which is an advantageous effect of the present invention, is remarkably exhibited.

According to a preferred aspect of the present invention, the outer sheet may have an amount of tensile deformation smaller in a long-side direction than in a short-side direction of the substantially rectangular shape. This aspect of the present invention is advantageous in shortening the time required to squeeze the liquid substance out of the bag-shaped container and reducing the liquid substance remaining amount.

According to a preferred aspect of the present invention, each of the inner sheet and the outer sheet may be formed of a single continuous sheet. This aspect of the present invention is advantageous in simplifying the structure of the pressure bag and facilitating the production thereof.

According to a preferred aspect of the present invention, the inner sheet may be folded back at a folding-back portion. The folding-back portion of the inner sheet may be disposed on a side corresponding to the first long side of the substantially rectangular shape. This aspect of the present invention enables the inner sheet to be formed using a single continuous sheet. This is advantageous in simplifying the structure of the pressure bag and facilitating the production thereof.

According to a preferred aspect of the present invention, the outer sheet may be folded back at a folding-back portion. The folding-back portion of the outer sheet may be disposed on a side corresponding to the first long side of the substantially rectangular shape. This aspect of the present invention enables the outer sheet to be formed using a single continuous sheet. This is advantageous in simplifying the structure of the pressure bag and facilitating the production thereof.

According to a preferred aspect of the present invention, all of outer peripheral ends of the inner sheet may be jointed to the outer sheet. With this aspect of the present invention, it is possible to obtain a hermetically-sealed pressure chamber with a simple configuration.

According to a preferred aspect of the present invention, the inner sheet and the outer sheet may not be joined to each other along the first long side of the substantially rectangular shape. This aspect of the present invention is advantageous in allowing portions of the pressure chamber (the first pressure chamber and the second pressure chamber) that are located on opposite sides of the housing chamber to be in communication with each other at the first long side. Also, this aspect of the present invention is advantageous in simplifying the structure of the pressure bag and facilitating the production thereof.

According to a preferred aspect of the present invention, the inner sheet may constitute an inner surface of the housing chamber, and the outer sheet may constitute an outer surface of the pressure bag. This aspect of the present invention is advantageous in simplifying the structure of the pressure bag and facilitating the production thereof.

According to a preferred aspect of the present invention, a hole may be formed in one short side or both short sides of the substantially rectangular shape such that the pressure bag can be suspended with either one of the short sides of the substantially rectangular shape being located on an upper side. With this aspect of the present invention, the liquid substance can be squeezed out of the bag-shaped container, with the pressure bag being suspended from, for example, an irrigator stand. This is advantageous when there is no room to place the pressure bag around a patient.

Hereinafter, the present invention will be described in detail while presenting preferred embodiments thereof. However, it goes without saying that the present invention is not limited to the embodiments below. In the drawings that will be referred to in the following description, the embodiments of the present invention are shown in a simplified manner. Accordingly, portions shown in the drawings below may be changed or omitted, or optional members or configurations that are not shown in the drawings below may be added, within the scope of the present invention. In different drawings, members that are the same are given the same reference numerals. With respect to such members, redundant descriptions are omitted, and the description of a preceding drawing should be taken into account as appropriate. Moreover, it should be understood that the dimensional ratios of portions in the drawings below may vary from drawing to drawing, and are not necessarily the same as the actual dimensional ratios of those portions.

FIG. 1 is a perspective view of a squeezing device 100 including a pressure bag 1 according to an embodiment of the present invention. The squeezing device 100 includes the pressure bag 1 and an air pump 110. The pressure bag 1 has a bag-like shape with an opening 11. A bag-shaped container 50 can be placed into and taken out of a housing chamber 10 of the pressure bag 1 via the opening 11. A liquid substance (for example, enteral nutritional agent) to be administered to a patient in enteral nutrition therapy is contained in the bag-shaped container 50. A communicating tube 17 provided in the pressure bag 1 is connected to a pliable first tube 101 via a pressure gauge 107. The pressure gauge 107 may have a limiter function of releasing air in a pressure chamber to the outside if the pressure in the pressure chamber exceeds a predetermined value and thereby keeping the pressure in the pressure chamber at the predetermined value or less. A pliable second tube 102 is connected to the air pump 110. The first tube 101 and the second tube 102 are connected to each other via a three-way stopcock 105 that also functions as a pressure release valve. Air is supplied to the pressure bag 1 using the air pump 110 to inflate the pressure bag 1 while the bag-shaped container 50 is housed in the housing chamber 10 of the pressure bag 1. The pressure bag 1 compresses the bag-shaped container 50, and the liquid substance is thereby squeezed out from a port 52 of the bag-shaped container 50.

Figure 2:
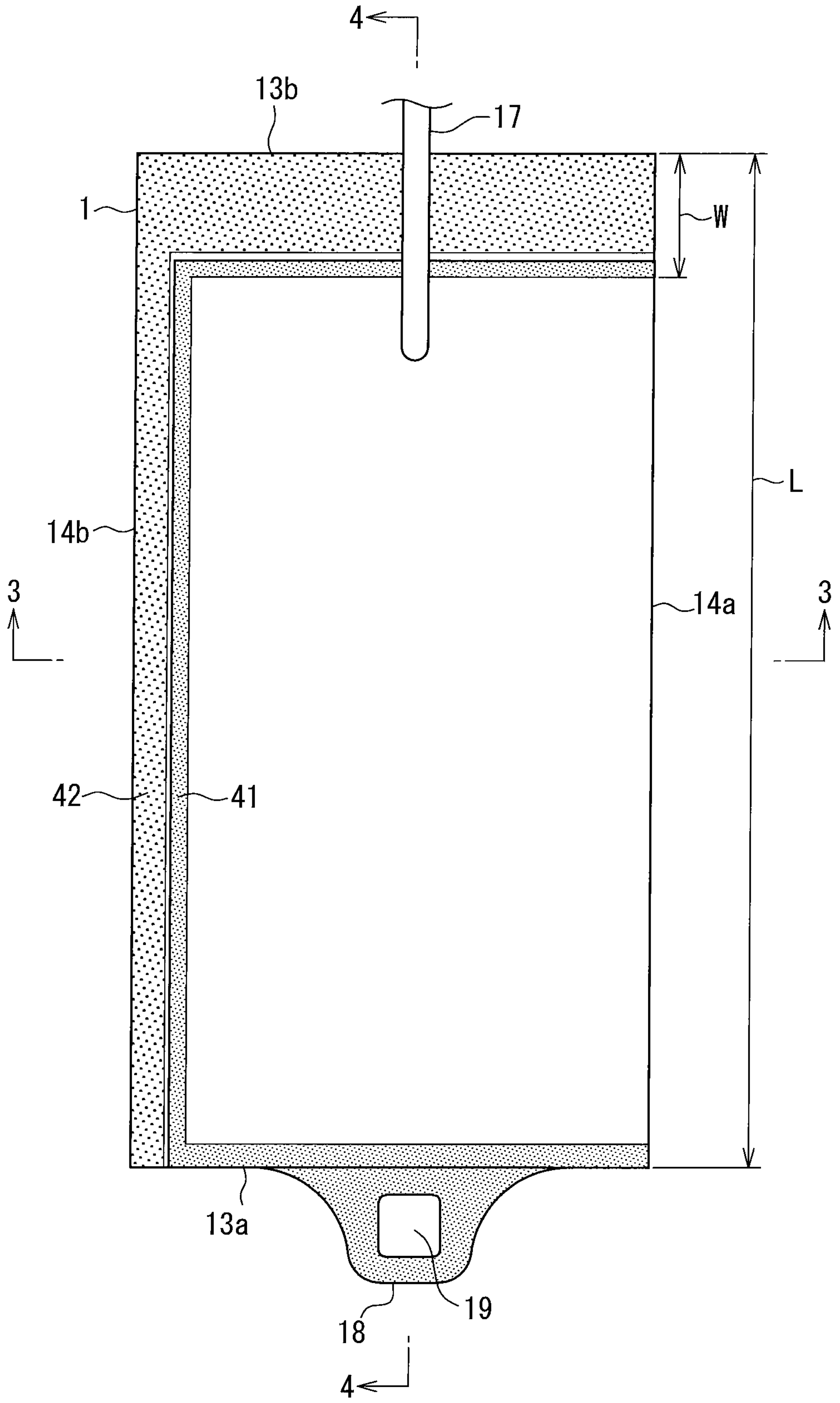
FIG. 2 is a plan view of the pressure bag according to the embodiment of the present invention.

FIG. 2 is a plan view of the pressure bag 1. The pressure bag 1 has a substantially rectangular shape in a plan view that includes a first short side 13*a*, a second short side 13*b*, a first long side 14*a*, and a second long side 14*b*. The opening 11 (see FIG. 1) of the pressure bag 1 is provided in the first short side 13*a*. An inner sheet-to-outer sheet joining region 41 (shaded with numerous dots, details will be described later) is provided along the first short side 13*a*, the second long side 14*b*, and the second short side 13*b*. An outer sheet-to-outer sheet joining region 42 (shaded with numerous dots, details will be described later) is provided along the second long side 14*b* and the second short side 13*b*. A portion of the inner sheet-to-outer sheet joining region 41 extending along the first short side 13*a* protrudes in the long-side direction, thereby forming a protruding portion 18. A hole 19 extending through the protruding portion 18 is formed in the protruding portion 18. The hole 19 can be used to suspend the pressure bag 1 by inserting a hook or the like into the hole 19.

In the following description, a direction vertical to the substantially rectangular shape of the pressure bag 1 (a direction vertical to the paper plane in FIG. 2) will be referred to as "the thickness direction" of the pressure bag 1. Likewise, a direction parallel to the short sides 13*a* and 13*b* will be referred to as "the short-side direction" of the pressure bag 1, and a direction parallel to the long sides 14*a* and 14*b* will be referred to as "the long-side direction" of the pressure bag 1.

Figure 3:
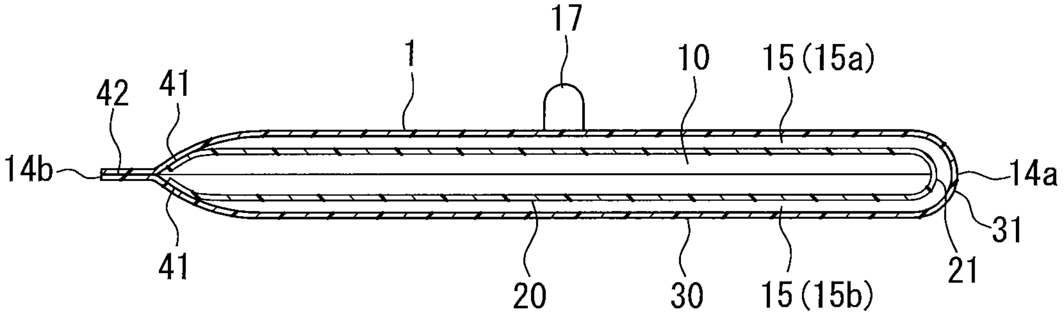
FIG. 3 is a cross sectional view of the pressure bag according to the embodiment of the present invention taken along the line 3-3 shown in FIG. 2.
Figure 4:
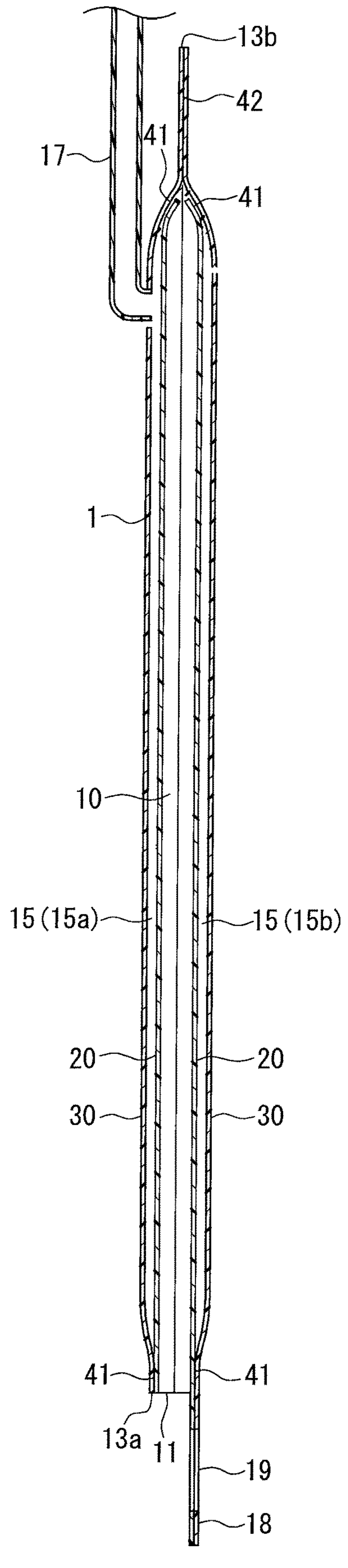
FIG. 4 is a cross sectional view of the pressure bag according to the embodiment of the present invention taken along the line 4-4 shown in FIG. 2.

FIG. 3 is a cross-sectional view of the pressure bag 1 taken along the line 3-3 parallel to the short sides 13*a* and 13*b* shown in FIG. 2. FIG. 4 is a cross-sectional view of the pressure bag 1 taken along the line 4-4 parallel to the long sides 14*a* and 14*b* shown in FIG. 2.

As shown in FIG. 3, the pressure bag 1 includes a single inner sheet 20 that is folded back at a folding-back portion 21 and a single outer sheet 30 that is folded back at a folding-back portion 31. The inner sheet 20 constitutes an inner surface of the housing chamber 10, and the outer sheet 30 constitutes an outer surface of the pressure bag 1. The pressure bag 1 has a double structure in which the inner sheet 20 and the outer sheet 30 that is located on the opposite side (outer side) of the inner sheet 20 from the housing chamber 10 are laid one on top of the other. The folding-back portion 21 of the inner sheet 20 and the folding-back portion 31 of the outer sheet 30 are disposed on a side corresponding to the first long side 14*a* of the pressure bag 1. The inner sheet 20 and the outer sheet 30 are laminated and joined together in an airtight manner in the inner sheet-to-outer sheet joining region 41. Two layers of the outer sheet 30 are laminated and joined together in an airtight manner in the outer sheet-to-outer sheet joining region 42. The inner sheet-to-outer sheet joining region 41 and the outer sheet-to-outer sheet joining region 42 are disposed on a side corresponding to the second long side 14*b* of the pressure bag 1. The outer sheet-to-outer sheet joining region 42 is disposed on the outer side of the inner sheet-to-outer sheet joining region 41.

As shown in FIG. 4, the inner sheet 20 and the outer sheet 30 are laminated and joined together in an airtight manner in the inner sheet-to-outer sheet joining region 41. Two layers of the outer sheet 30 are laminated and joined together in an airtight manner in the outer sheet-to-outer sheet joining region 42. The inner sheet-to-outer sheet joining region 41 and the outer sheet-to-outer sheet joining region 42 are disposed on a side corresponding to the first short side 13*a* and a side corresponding to the second short side 13*b* of the pressure bag 1. In the second short side 13*b*, the outer sheet-to-outer sheet joining region 42 is disposed on the outer side of the inner sheet-to-outer sheet joining region 41.

As is clear from the above, all of outer peripheral ends of the inner sheet 20 are joined to the outer sheet 30 in the inner sheet-to-outer sheet joining region 41. As a result, a hermetically-sealed pressure chamber 15 is formed between the inner sheet 20 and the outer sheet 30. All of the inner sheet 20, the outer sheet 30, and the pressure chamber 15 between the inner sheet 20 and the outer sheet 30 extend in a substantially "U" shape from one side (upper side in FIG. 3) to the other side (lower side in FIG. 3) of the housing chamber 10, on the side corresponding to the first long side 14*a* (see FIG. 3). The inner sheet 20 and the outer sheet 30 are not joined (or sealed) to each other along the first long side 14*a*. Accordingly, a pressure chamber (first pressure chamber) 15*a* that is located on one side of the housing chamber 10 and a pressure chamber (second pressure chamber) 15*b* that is located on the other side of the housing chamber 10 are in communication with each other via the first long side 14*a*.

The communicating tube 17 is a pipe that has a hollow cylindrical shape, and is bent into a substantially "L" shape. The communicating tube 17 is connected to a through hole formed in the outer sheet 30 in an airtight manner (see FIG. 4). The pressure chamber 15 is in communication with the outside only via the communicating tube 17. In the present embodiment, the communicating tube 17 is connected to a portion of the outer sheet 30 that constitutes the first pressure chamber 15*a*.

In FIGS. 3 and 4, portions of the inner sheet 20 that oppose each other via the housing chamber 10 are slightly spaced apart from each other in the thickness direction, and the inner sheet 20 and the outer sheet 30 that oppose each other via the pressure chamber 15 are slightly spaced apart from each other in the thickness direction. However, these are to facilitate understanding of the configuration of the pressure bag 1. In the pressure bag 1 that is deflated when not in use, the portions of the inner sheet 20 that oppose each other via the housing chamber 10 may be in close contact with each other in the thickness direction, and the inner sheet 20 and the outer sheet 30 that oppose each other via the pressure chamber 15 may be in close contact with each other in the thickness direction. That is to say, the pressure bag 1 when not in use may have a thin plate-like shape in which two layers of the outer sheet 30 and two layers of the inner sheet 20 between the two layers of the outer sheet 30 are in close contact with one another in the thickness direction.

Also, in FIG. 3, at the first long side 14*a*, the folding-back portion 21 of the inner sheet 20 and the folding-back portion 31 of the outer sheet 30 are slightly spaced apart from each other in the short-side direction. However, these are also to facilitate understanding of the configuration of the pressure bag 1. As can be readily understood from a method for producing a pressure bag 1, which will be described later, in the pressure bag 1 that is deflated when not in use, the folding-back portion 21 and the folding-back portion 31 may be in contact with each other in the short-side direction along the first long side 14*a*.

The inner sheet 20 and the outer sheet 30 have flexibility (or pliability) so that they can be easily deformed. Preferably, the inner sheet 20 and the outer sheet 30 also have sealability so that even when a fluid (for example, air) is injected into the pressure chamber 15 under a predetermined pressure (for example, 60 kPa), the fluid is prevented from leaking to the outside, and mechanical strength so that even when the fluid is injected as described above, the pressure bag 1 is prevented from exploding. As long as these properties are satisfied, there is no limitation on the materials of the inner sheet 20 and the outer sheet 30, and, for example, resin materials, such as polyethylene terephthalate, nylon, polypropylene, polyethylene, and soft polyvinyl chloride, can be used. The inner sheet 20 and the outer sheet 30 may each be a laminated sheet in which a plurality of layers made of different materials are laminated. The materials of the inner sheet 20 and the outer sheet 30 may be the same or may be different. In order for pressure to be effectively applied to the bag-shaped container 50 in the housing chamber 10 when the pressure chamber 15 is inflated, it is preferable that the outer sheet 30 has substantially no stretchability. The inner sheet 20 may or may not have stretchability.

Any material can be used for the communicating tube 17 as long as the pressure chamber 15 can be in communication with the outside via the communication tube 17. Both a substantially undeformable hard material and an easily deformable soft material may be used. Examples of the hard material that can be used include resin materials, such as polyethylene, polypropylene, polyacetal, polycarbonate, polyethylene terephthalate, polybutylene terephthalate, butylene-styrene block copolymers, polyoxymethylene, acrylonitrile-butadiene-styrene copolymers, polystyrene, polyamide, and hard polyvinyl chloride; as well as metal materials, such as stainless steel, iron, and aluminum. Examples of the soft material that can be used include rubber, such as natural rubber, isoprene rubber, and silicone rubber; thermoplastic elastomers, such as styrene elastomers, olefin elastomers, and polyurethane elastomers; and soft polyvinyl chloride.

The pressure chamber 15 of the pressure bag 1 is inflated as a result of a fluid being injected into the pressure chamber 15 via the communicating tube 17. The fluid to be injected may be either a gas or a liquid, but a gas, in particular, air is preferable. The squeezing device 100 shown in FIG. 1 includes the air pump 110 to inject air into the pressure chamber 15. The air pump 110 is a manual piston pump that is capable of feeding air to the second tube 102 as a result of a handle 112 being moved back and forth relative to a pump base portion 111. However, the pump for injecting air into the pressure chamber 15 is not limited thereto, and may also be, for example, a manual air balloon or any electric pump. The air balloon is a hollow body made of rubber or the like and having a spherical shape, a rugby ball shape, or the like, and can discharge air when compressed.

The bag-shaped container 50 (see FIG. 1) is preferably, but is not limited to, for example, a bag-shaped product that is composed of a flexible sheet and commonly called a "pouch" or "laminate pack". The bag-shaped container 50 may have any configuration such as, for example, a flat bag-shaped pouch in which two substantially rectangular sheets having the same dimensions are laid one on top of the other and bonded to each other at outer peripheral ends thereof, a standing pouch composed of two substantially rectangular sheets constituting front and back surfaces thereof and a single sheet constituting a bottom surface thereof, and a box-shaped pouch (also referred to as "square bottom pouch") composed of two substantially rectangular sheets constituting front and back surfaces thereof and a sheet for forming a gusset between the two substantially rectangular sheets. The bag-shaped container 50 is provided with a port (also called "spout") 52 through which the liquid substance flows out. In the present embodiment, the port 52 is provided in the middle of a short side of the bag-shaped container 50, which has a substantially rectangular shape in a plan view. However, the position of the port 52 is not limited to this position, and, for example, the port 52 may be provided in a corner portion where a short side and a long side intersect each other, while being inclined relative to the short side and the long side.

There is no limitation on the type of liquid substance contained in the bag-shaped container 50. For example, the liquid substance may be any liquid substance, such as a nutritional agent (for example, enteral nutritional agent used in enteral nutrition therapy), a liquid diet, a contrast medium, hyaluronic acid, a physiological saline solution, and blood. The liquid substance may be thickened (or semi-solid) to a high viscosity of, for example, 1,000 mPa·s or more. Preferably, the upper limit of the viscosity of the liquid substance is, but is not limited to, 50,000 mPa·s or less.

An example of a method for producing a pressure bag 1 will be described.

Figure 5:
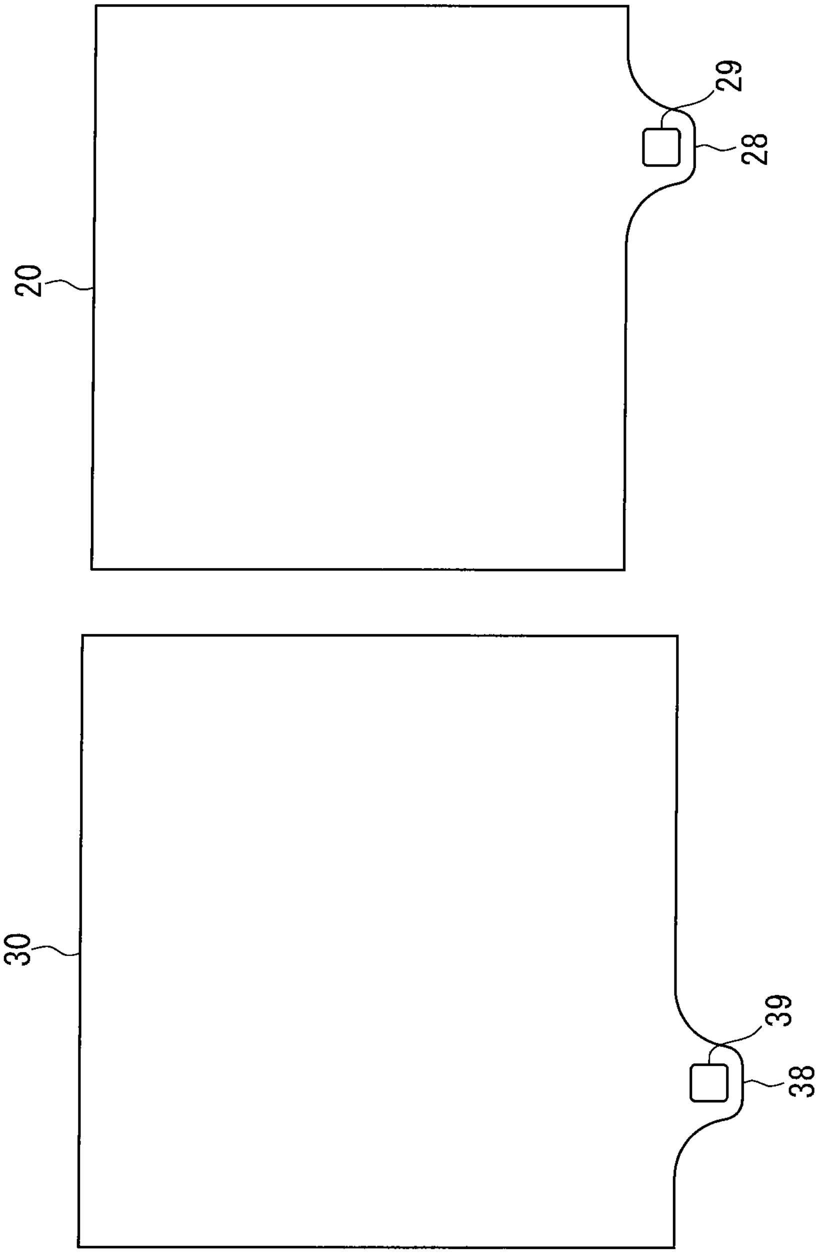
FIG. 5 is a plan view showing a step of a method for producing a pressure bag according to an embodiment of the present invention.

First, as shown in FIG. 5, an inner sheet 20 and an outer sheet 30 are prepared. The inner sheet 20 and the outer sheet 30 both have a substantially rectangular shape. The outer sheet 30 is larger than the inner sheet 20 in both longitudinal and transverse directions. The inner sheet 20 and the outer sheet 30 respectively include protruding portions 28 and 38 that protrude from one side thereof and constitute the protruding portion 18 (see FIGS. 1 and 2) of the pressure bag 1. In the protruding portions 28 and 38, holes 29 and 39 that constitute the hole 19 (see FIGS. 1 and 2) of the pressure bag 1 are formed, respectively. In the present embodiment, the inner sheet 20 and the outer sheet 30 are obtained by cutting out from the same original material sheet. The original material sheet may be composed of a woven-fabric (for example, nylon woven-fabric) that constitutes a substrate layer and a heat seal layer (for example, urethane layer) that entirely covers one surface of the substrate layer as a coating. In FIG. 5, the heat seal layer is provided on a surface shown on the front side. Although not shown in the diagram, a through hole is formed in the outer sheet 30, and the communicating tube 17 is joined to an opening end of the through hole in an airtight manner. There is no limitation on the method for joining the outer sheet 30 and the communicating tube 17 to each other, but, for example, a method in which an adhesive is applied, a fusion-bonding method, or the like can be used.

Figure 6:
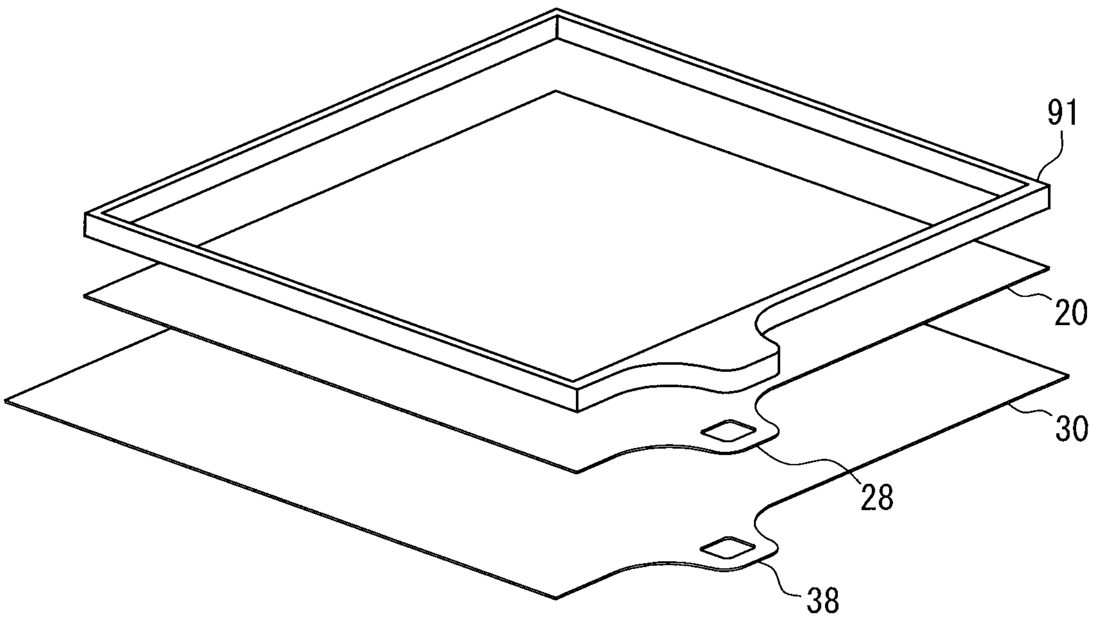
FIG. 6 is a perspective view showing a subsequent step of the method for producing a pressure bag according to the embodiment of the present invention.

Next, as shown in FIG. 6, the outer sheet 30 and the inner sheet 20 are laid one on top of the other on a flat surface such that the surfaces of the outer sheet 30 and the inner sheet 20 on each of which the heat seal layer is provided oppose each other. The inner sheet 20 is positioned on the outer sheet 30 such that the protruding portion 38 of the outer sheet 30 and the protruding portion 28 of the inner sheet 20 overlap each other, and the side of the outer sheet 30 where the protruding portion 38 is provided and the side of the inner sheet 20 where the protruding portion 28 is provided match each other. Then, a heated first welding mold 91 is placed on the laminate of the outer sheet 30 and the inner sheet 20. The first welding mold 91 has a rectangular frame-like shape that extends along outer peripheral ends of the inner sheet 20. The first welding mold 91 is positioned on the outer peripheral ends of the inner sheet 20, and then pressed against the inner sheet 20 and the outer sheet 30. In the region pressed by the first welding mold 91, the heat seal layer of the inner sheet 20 and the heat seal layer of the outer sheet 30 are heat sealed, and an inner sheet-to-outer sheet joining region 41 is thereby formed.

Figure 7:
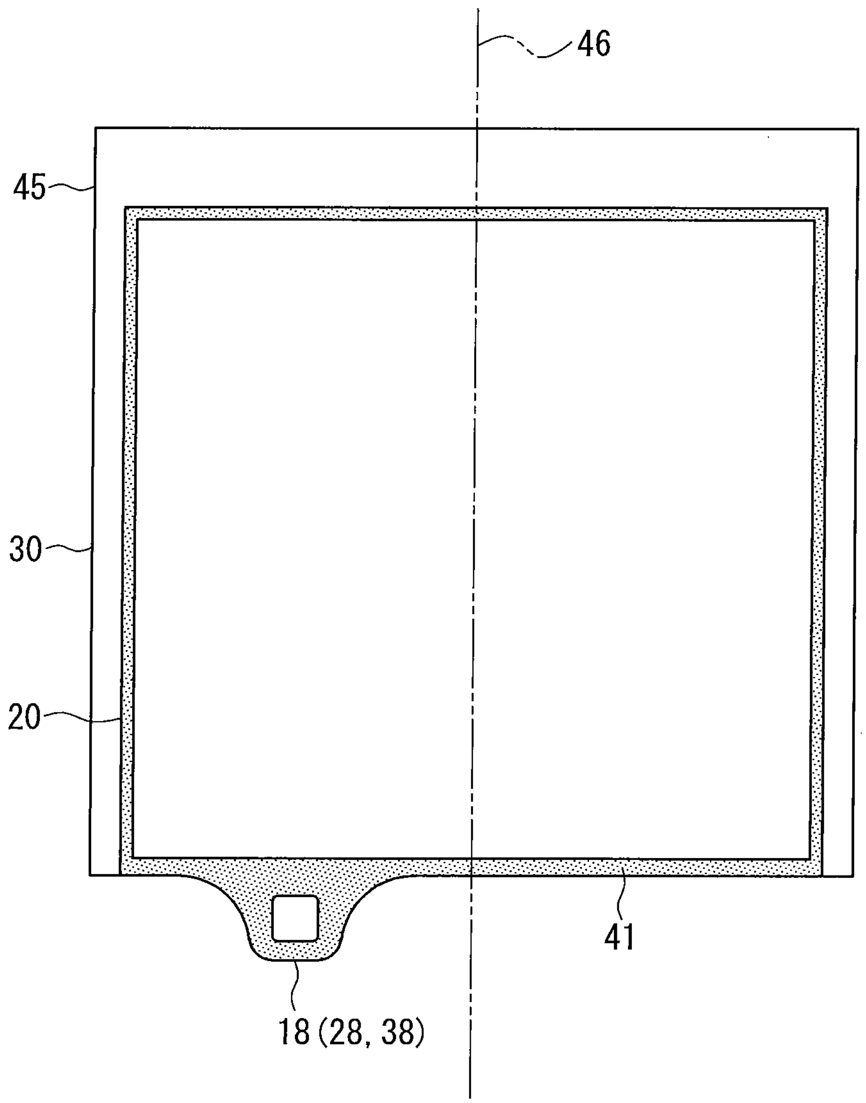
FIG. 7 is a plan view showing a subsequent step of the method for producing a pressure bag according to the embodiment of the present invention.

A laminated sheet 45 as shown in FIG. 7 that is composed of the inner sheet 20 and the outer sheet 30 and in which the inner sheet-to-outer sheet joining region 41 that has a rectangular frame-like shape (a region shaded with numerous dots in FIG. 7) is formed can be obtained. In the inner sheet-to-outer sheet joining region 41, the outer sheet 30 and the inner sheet 20 are laminated and joined together. The inner sheet-to-outer sheet joining region 41 is formed extending along all of outer peripheral ends of the inner sheet 20. The three sides of the outer sheet 30 excluding the side of the outer sheet 30 from which the protruding portion 18 protrudes extend outside the inner sheet 20 (or the inner sheet-to-outer sheet joining region 41).

Figure 8:
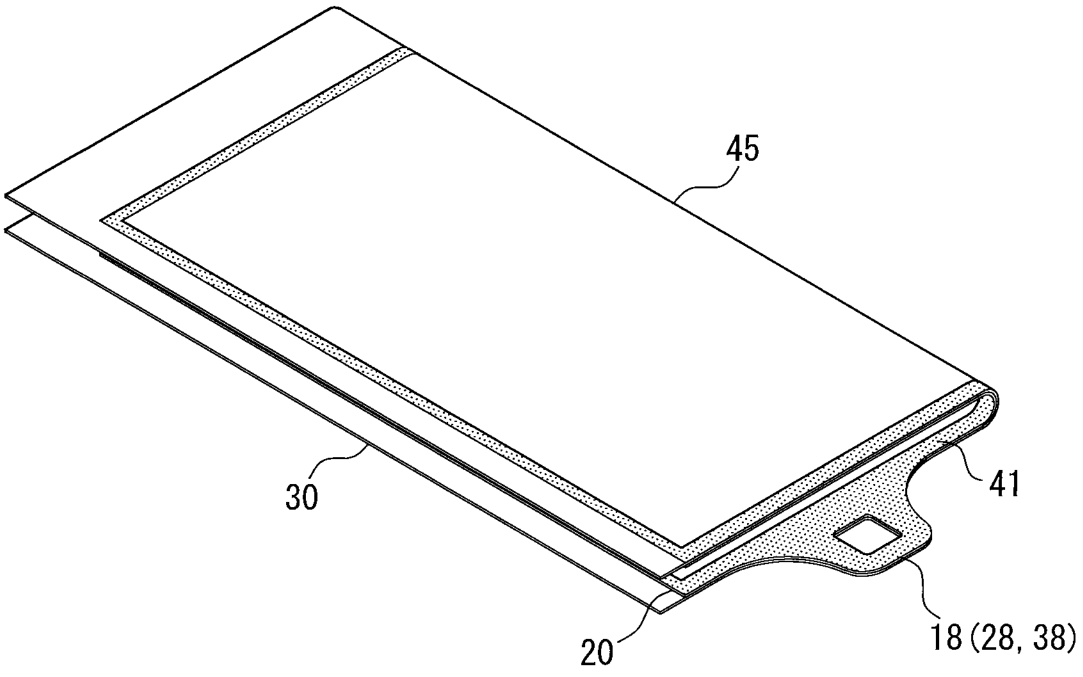
FIG. 8 is a perspective view showing a subsequent step of the method for producing a pressure bag according to the embodiment of the present invention.

Next, as shown in FIG. 8, the laminated sheet 45 is folded back (or in other words, folded in two) along a line-double dash line 46 shown in FIG. 7, with the inner sheet 20 facing inward. The inner sheet-to-outer sheet joining region 41 that has a rectangular frame-like shape is folded in two and laminated. The outer sheet 30 extending outside the inner sheet-to-outer sheet joining region 41 is folded in two and laminated. A fold of the inner sheet 20 formed along the line-double dash line 46 constitutes the folding-back portion 21 of the inner sheet 20 (see FIG. 3). Likewise, a fold of the outer sheet 30 formed along the line-double dash line 46 constitutes the folding-back portion 31 of the outer sheet 30 (see FIG. 3).

Figure 9:
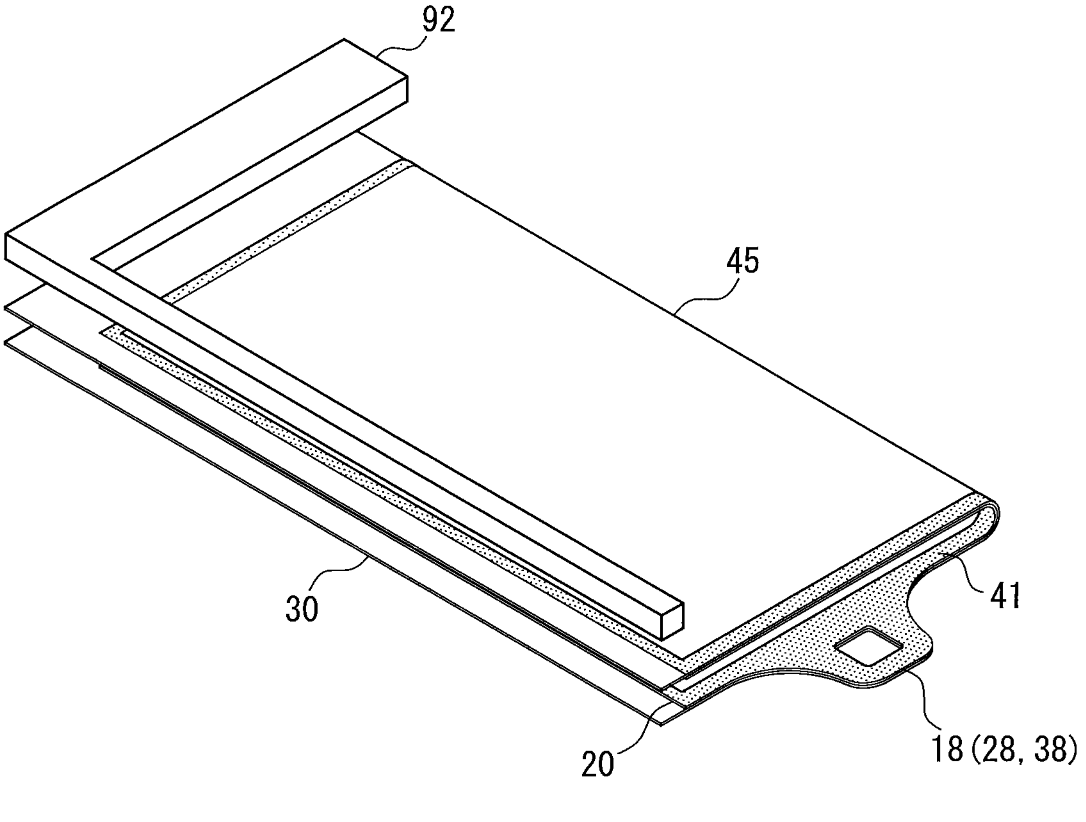
FIG. 9 is a perspective view showing a subsequent step of the method for producing a pressure bag according to the embodiment of the present invention.

Next, as shown in FIG. 9, the laminated sheet 45 folded in two shown in FIG. 8 is placed on a flat surface, and a heated second welding mold 92 is placed thereon. The second welding mold 92 has a substantially "L" shape that extends along two adjacent sides of the outer sheet 30. The second welding mold 92 is positioned on a portion that is outside of the inner sheet-to-outer sheet joining region 41 and in which the two layers of the outer sheet 30 are laminated, and then pressed against the outer sheet 30. In the region pressed by the second welding mold 92, the heat seal layers of the two layers of the outer sheet 30 are heated sealed to each other, and an outer sheet-to-outer sheet joining region 42 is thereby formed.

In the manner described above, the pressure bag 1 shown in FIGS. 2 to 4 is obtained. The pressure bag 1 has a substantially rectangular shape in a plan view. The laminated sheet 45 (see FIG. 7) that has a double structure that includes the inner sheet 20 and the outer sheet 30 is folded back at the first long side 14_a_, and the two layers of the outer sheet 30 are joined to each other in the outer sheet-to-outer sheet joining region 42 that extends along the second long side 14_b_ and the second short side 13_b_. The pressure bag 1 has a bag-like shape with an opening 11 in the first short side 13_a_. The housing chamber 10 of the pressure bag 1 is in communication with the outside only via the opening 11. In the laminated sheet 45, all of outer peripheral ends of the inner sheet 20 are joined to the outer sheet 30 in the inner sheet-to-outer sheet joining region 41 (see FIG. 7). Accordingly, a hermetically-sealed pressure chamber 15 is formed between the inner sheet 20 and the outer sheet 30. The pressure chamber 15 is in communication with the outside only via the communicating tube 17. As with the inner sheet 20 and the outer sheet 30, the pressure chamber 15 is also folded back at the first long side 14_a_.

With the production method described above, in the laminated sheet 45 (see FIG. 7), three sides of the outer sheet 30 extend outside the inner sheet 20 (or the inner sheet-to-outer sheet joining region 41). Accordingly, the outer sheet-to-outer sheet joining region 42 that extends along the second long side 14_b_ and the second short side 13_b_ can be formed by laminating portions of the outer sheet 30 that extend outside the inner sheet-to-outer sheet joining region 41 to each other when the laminated sheet 45 is folded in two afterward. That is to say, an outer sheet-to-outer sheet joining region 44 in which two layers of the outer sheet 30 are laid one on top of the other and joined to each other is formed on the outside of the inner sheet-to-outer sheet joining region 41 in which the inner sheet 20 and the outer sheet 30 are joined to each other. Despite the fact that the finally obtained pressure bag 1 has a double structure in which the inner sheet 20 and the outer sheet 30 are laid one on top of the other, the pressure bag 1 does not include a four-layer joining region in which a total of four layers including two layers of the inner sheet 20 and two layers of the outer sheet 30 are laid one on top of the other and joined to each other. In general, when heat sealing is performed, it is more difficult to appropriately manage the pressure applied to each sheet, the temperature of each sheet, and the like as the number of sheets laminated increases, which increases the possibility of defective portions where the desired airtightness and joining strength cannot be obtained occurring in the obtained joining region. In the pressure bag 1 according to the present embodiment, the outer sheet-to-outer sheet joining region 42 is always disposed on the outer side of the inner sheet-to-outer sheet joining region 41. This configuration enables all of the joining regions 41 and 42 formed in the pressure bag 1 to constitute two-layer joining regions in each of which only two sheet layers are joined. The pressure and temperature can be much more easily managed when only two sheet layers are joined than when four sheet layers are joined. Accordingly, the occurrence of defective portions in the joining regions is suppressed, and the airtightness and the joining strength of the joining regions are improved. According to the present embodiment, the yield can be improved, and a high-quality pressure bag 1 can be produced in a stable manner.

Next, an example of enteral nutrition therapy using a squeezing device 100 equipped with a pressure bag 1 (see FIG. 1) will be described.

As shown in FIG. 1, a squeezing device 100 and a bag-shaped container 50 are prepared. The pressure chamber 15 (see FIGS. 3 and 4) of the pressure bag 1 is not inflated, and the inner sheet 20 and the outer sheet 30 that define the pressure chamber 15 are substantially in close contact with each other. A liquid substance (for example, enteral nutritional agent) is contained in the bag-shaped container 50. Although not shown, an upstream end of a pliable tube (for example, enteral nutrition set) is connected to the port 52 of the bag-shaped container 50. A downstream end of the tube is connected to a catheter that is inserted in a patient. The catheter may be, for example, a PEG catheter that is inserted into a gastric fistula formed in the abdomen of the patient. The tube is provided with a clamp (not shown) for opening and closing a flow path in the tube. At this time, the flow path in the tube is closed by the clamp.

Figure 10:
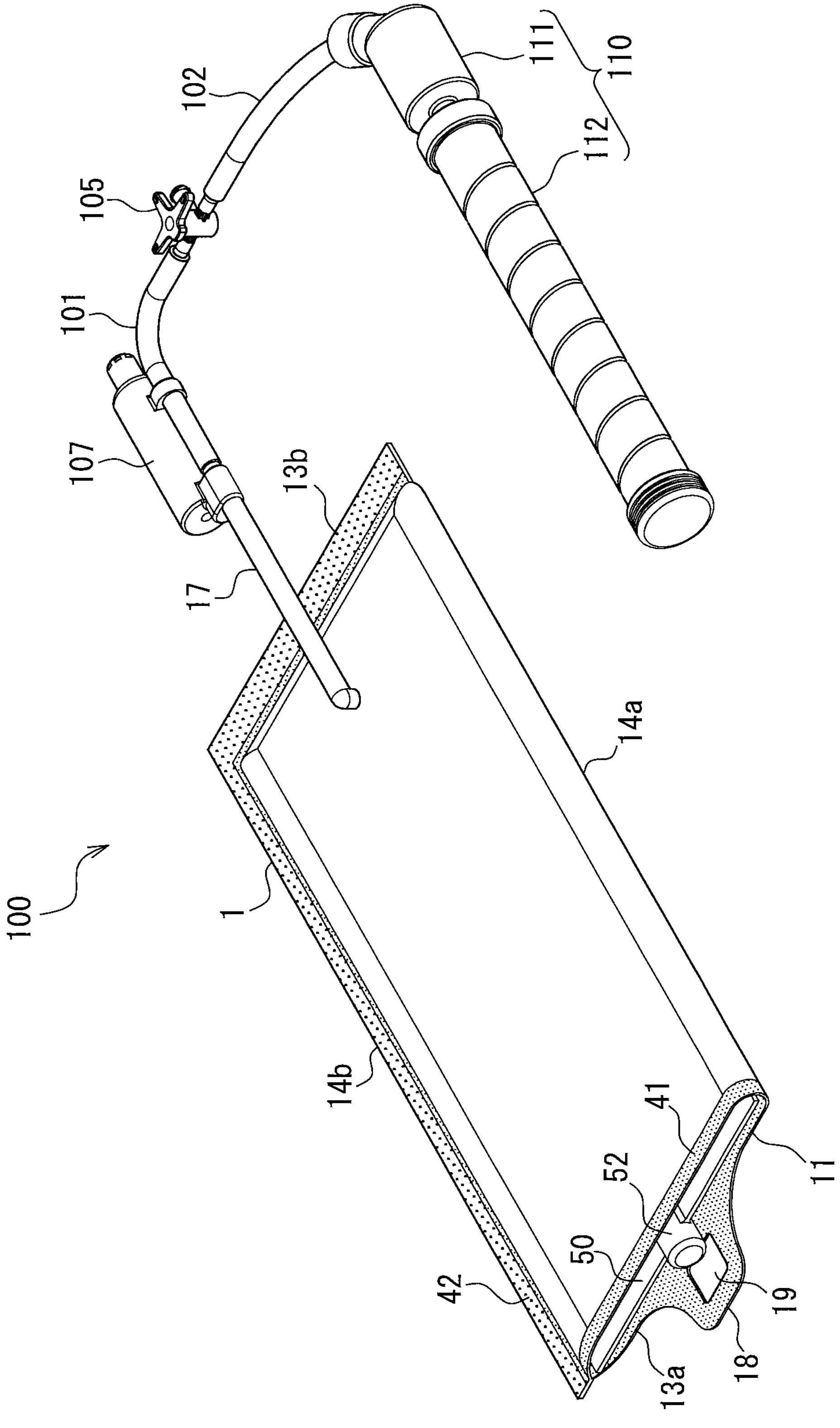
FIG. 10 is a perspective view illustrating a method for using the squeezing device including a pressure bag according to the embodiment of the present invention.

Next, as shown in FIG. 10, the bag-shaped container 50 is placed into the housing chamber 10 from the opening 11 of the pressure bag 1. The three-way stopcock 105 is operated to bring the first tube 101 and the second tube 102 into communication with each other. The air pump 110 is operated to supply air to the pressure chamber 15 of the pressure bag 1. The pressure chamber 15 inflates and applies pressure to the bag-shaped container 50 housed in the housing chamber 10. However, the flow path in the tube (not shown) connected to the port 52 is closed by the clamp, and thus the liquid substance cannot flow out of the bag-shaped container 50.

The pressure in the pressure chamber 15 can be checked using the pressure gauge 107. After it is confirmed that the pressure in the pressure chamber 15 has reached a predetermined value (for example, 40 kPa), the three-way stopcock 105 is operated to close the communication between the first tube 101 and the second tube 102. Next, the clamp of the tube connected to the port 52 is opened. The liquid substance is squeezed out of the bag-shaped container 50 via the port 52, and administered to the patient. The reduction in the volume of the bag-shaped container 50 as a result of the liquid substance flowing out of the bag-shaped container 50 is small. Accordingly, the reduction in the pressure in the pressure chamber 15 as a result of the liquid substance flowing out of the bag-shaped container 50 is very small.

After the squeezing of the liquid substance out of the bag-shaped container 50 is completed, the three-way stopcock 105 is operated to bring the first tube 101 into communication with the outside. The pressure in the pressure chamber 15 is released to the outside via the communicating tube 17, the first tube 101, and the three-way stopcock 105. After the pressure bag 1 is deflated, the bag-shaped container 50 is taken out of the housing chamber 10. The bag-shaped container 50 is compressed into a substantially flat thin plate-like shape by the pressure bag 1. If necessary, the bag-shaped container 50 may be, for example, firmly squeezed to completely force a small amount of the liquid substance remaining in the bag-shaped container 50 out of the bag-shaped container 50. Also, the pressure bag 1 out of which the bag-shaped container 50 has been taken out is compressed to completely discharge the air in the pressure chamber 15 to the outside.

As described above, the conventional pressure bag disclosed in Patent Document 1 is configured such that the pressure chamber extends from one side to the other side of the housing chamber via the bottom portion (corresponding to the second short side 13*b* of the pressure bag 1 according to the present embodiment) of the hag-like shape. The following problem arises when enteral nutrition therapy is performed by replacing the pressure bag 1 of the squeezing device 100 with the conventional pressure bag. That is to say, after the pressure chamber is inflated and the liquid substance is squeezed out of the bag-shaped container, the air in the pressure chamber cannot be sufficiently discharged to the outside by simply operating the three-way stopcock to release the pressure in the pressure chamber to the outside (or in other words, the air release property is poor). The pressure chamber remains inflated, and thus the bag-shaped container still receives the compression force by the pressure chamber. Accordingly, it is difficult to take the bag-shaped container out of the pressure bag. It is necessary to manually compress the pressure bag to discharge the air in the pressure chamber to the outside. It is not possible to end the enteral nutrition therapy, and the enteral nutrition therapy requires a long time.

The inventors of the present application finally found that the reason that the conventional pressure bag has poor air release property is that the pressure chamber extends from one side to the other side of the housing chamber via the bottom portion of the bag-like shape. In the pressure bag in which the pressure chamber extends from one side to the other side of the housing chamber, the fluidity of air between a pressure chamber (first pressure chamber) on one side and a pressure chamber (second pressure chamber) on the other side greatly affects the air release property. In the conventional pressure bag, the first pressure chamber and the second pressure chamber are in communication with each other via the bottom portion of the bag-like shape. The bottom portion is located on a short side of the bag-like shape that has a substantially rectangular shape in a plan view, and thus the cross-sectional area of the flow path that connects the first pressure chamber and the second pressure chamber is small. This causes the poor air release property.

In contrast, in the pressure bag 1 according to the present embodiment, the pressure chamber 15 extends from one side (the first pressure chamber 15*a*) to the other side (the second pressure chamber 15*b*) of the housing chamber 10 via the first long side 14*a*. The first long side 14*a* is longer than the bottom portion of the bag-like shape (or in other words, the second short side 13*b*), and thus the cross-sectional area of the flow path that connects the first pressure chamber 15*a* and the second pressure chamber 15*b* is large. Accordingly, the pressure bag 1 according to the present embodiment has good air release property. When the three-way stopcock 105 is operated to release the pressure in the pressure chamber 15, the air in the pressure chamber 15 is immediately discharged to the outside, and the pressure chamber 15 rapidly deflates. The time from when the three-way stopcock 105 is operated to when the bag-shaped container 50 is ready to be taken out of the pressure bag 1 is very short. Accordingly, enteral nutrition therapy can be performed in a short of time.

In the case where the communicating tube 17 is provided to be in communication with the first pressure chamber 15*a* on one side of the housing chamber 10 as in the present embodiment, the effect of providing good air release property, which is an advantageous effect of the present invention, is remarkably exhibited. This is because, in order for the air in the second pressure chamber 15*b* on the other side of the housing chamber 10 to flow out to the outside via the communicating tube 17, the air in the second pressure chamber 15*b* must move to the first pressure chamber 15*a*.

In the present embodiment, as shown in FIG. 2, the width W in the long-side direction of the joining regions 41 and 42 provided along the second short side 13*b* is preferably 8% or more, and more preferably 10% or more of the length L in the long-side direction of the pressure bag 1. Also, the width W is preferably 20 mm or more, more preferably 25 mm or more, and even more preferably 30 mm or more. The above-described preferred conditions are advantageous in reducing the amount (liquid substance remaining amount) of the liquid substance remaining in the bag-shaped container 50 after the liquid substance has been squeezed out of the bag-shaped container 50 using the pressure bag 1. Although the reason is not clearly known, the inventors of the present application generally consider the reason as follows. When the pressure chamber 15 is inflated while the bag-shaped container 50 is housed in the housing chamber 10, the joining regions 41 and 42 extending along the second short side 13*b* deform in the long-side direction such that a middle portion thereof in the short-side direction approaches the pressure chamber 15 (or the first short side 13*a*) side, and also deform into a corrugated shape in the thickness direction. Such deformation of the joining regions 41 and 42 weakens the pressure in the thickness direction applied to portions near the joining regions 41 and 42 (the second short side 13*b*) of the bag-shaped container 50 housed in the housing chamber 10 by the pressure chamber 15. This causes an increase in the liquid substance remaining amount. Accordingly, by increasing the width W of the joining regions 41 and 42 that have a relatively high strength as a result of a plurality of sheets being joined, the deformation of the joining regions 41 and 42 can be suppressed, as a result of which, the liquid substance remaining amount can be reduced. However, when the width W of the joining regions 41 and 42 is too large, not only the effect of reducing the liquid substance remaining amount is reduced, but also the pressure bag 1 increases in size, which reduces the ease of handling. Accordingly, the width W of the joining regions 41 and 42 is preferably 30% or less, and more preferably 20% or less of the length L in the long-side direction of the pressure bag 1, and is preferably 70 mm or less, and more preferably 50 mm or less. As used herein, the width W of the joining regions 41 and 42 is the total of the length in the long-side direction of the inner sheet-to-outer sheet joining region 41 and the length in the long-side direction of the outer sheet-to-outer sheet joining region 42, and does not include the length in the long-side direction of a gap between the inner sheet-to-outer sheet joining region 41 and the outer sheet-to-outer sheet joining region 42 in the case where the inner sheet-to-outer sheet joining region 41 and the outer sheet-to-outer sheet joining region 42 are slightly spaced apart from each other in the long-side direction. Also, the length L in the long-side direction of the pressure bag 1 does not include the protruding portion 18 provided on the first short side 13*a* and/or the second short side 13*b*.

The inner length of the housing chamber 10 of the pressure bag 1 is preferably set according to the outer length of the bag-shaped container 50. If the housing chamber 10 is much larger than the bag-shaped container 50, the position of the bag-shaped container 50 in the housing chamber 10 may vary from user to user of the pressure bag 1. In this case, the liquid substance remaining amount may vary depending on the position of the bag-shaped container 50 in the housing chamber 10. It is desired to stably reduce the liquid substance remaining amount by reducing the variation in the position of the bag-shaped container 50 in the housing chamber 10. From this viewpoint, the inner length of the housing chamber 10 of the pressure bag 1 in the long-side direction (the distance from the opening 11 to the deepest portion of the housing chamber 10) are preferably 1.3 times or less, and more preferably 1.2 times or less the outer length of the bag-shaped container 50 in the long-side direction (excluding the port 52). Conversely, if the housing chamber 10 is small relative to the bag-shaped container 50, it is not possible to compress all sides of the bag-shaped container 50, and thus the liquid substance remaining amount increases. Accordingly, from the viewpoint of reducing the liquid substance remaining amount, the inner length of the housing chamber 10 of the pressure bag 1 in the long-side direction is preferably 1.0 times or more, and more preferably 1.05 times or more the outer length of the bag-shaped container 50 in the long-side direction.

When the pressure chamber 15 is inflated while the bag-shaped container 50 is housed in the housing chamber 10, the outer sheet 30 of the pressure bag 1 expands into a substantially rugby ball shape as a whole. The inventors of the present application experimentally confirmed that the liquid substance can be squeezed out of the bag-shaped container 50 in a short time, and the liquid substance remaining amount can be reduced, if the amount of extension of the outer sheet 30 in the long-side direction is relatively small when the pressure chamber 15 is inflated. Accordingly, the amount of tensile deformation of the outer sheet 30 is preferably smaller in the long-side direction than in the short-side direction of the pressure bag 1. The amount of tensile deformation can be evaluated based on extension rate determined by cutting out an elongated sample with a predetermined width from the outer sheet 30 and pulling the sample in the lengthwise direction thereof. Specifically, in the case where the outer sheet 30 includes a woven-fabric as in the embodiment given above, because the amount of tensile deformation correlates with fiber density, the woven-fabric is preferably configured such that fibers extending parallel to the long-side direction (warps) are denser than fibers extending in the short-side direction (wefts). In general, in the case where the outer sheet 30 (see FIG. 5) is obtained by cutting out from an original material sheet, the outer sheet 30 is preferably cut out such that the long-side direction of the pressure bag 1 matches the warp direction of the original material sheet.

It should be understood that the embodiment given above is merely exemplary. The present invention is not limited to the embodiment given above, and modifications can be made thereto as appropriate.

In the embodiment given above, in the second long side 14*b* and the second short side 13*b*, the outer sheet-to-outer sheet joining region 42 is disposed on the outer side of the inner sheet-to-outer sheet joining region 41. However, the present invention is not limited thereto. For example, a four-layer joining region, in which four sheet layers including two layers of the outer sheet 30 and two layers of the inner sheet 20 therebetween are laid one on top of another and joined to each other, may be formed along the second long side 14*b* and/or the second short side 13*b*. In the case where the four-layer joining region is formed along the second long side 14*b* and the second short side 13*b*, the inner sheet 20 and the outer sheet 30 having the same dimensions can be used (see FIG. 5). In the case where the inner sheet 20 and the outer sheet 30 are obtained by cutting out from the same original material sheet, it is no longer necessary to make a distinction between the inner sheet 20 and the outer sheet 30, and thus the production of the pressure bag can be simplified.

The communicating tube 17 may be provided at any position. The communicating tube 17 may be provided in the outer sheet 30 so as to be in commutation with the second pressure chamber 15*b*, or may be provided in the folding-back portion 31 of the outer sheet 30. Alternatively, the communicating tube 17 may be provided between the inner sheet 20 and the outer sheet 30 in the inner sheet-to-outer sheet joining region 41 extending along the first short side 13*a*. As the shape of the communicating tube 17, the communicating tube 17 does not necessarily need to be bent into a substantially "L" shape, and may have, for example, a linear shape without a bent portion.

The pressure bag according to the present invention has a substantially rectangular shape in a plan view when the bag-shaped container is not housed, and the pressure chamber is not inflated. As used herein, the term "a substantially rectangular shape" does not only strictly mean "a rectangular shape", but also encompasses a shape that can be deemed as "an essentially rectangular shape". For example, the term "a substantially rectangular shape" may encompass a rectangular shape with at least one of four corners being rounded or chamfered, a rectangular shape with at least one of four sides having a protruding portion (for example, protruding portion 18) or a concave cutout, and the like.

In the embodiment given above, the hole 19 is formed in the first short side 13*a* on the second pressure chamber 15*b* side. However, the present invention is not limited thereto. The hole 19 may be formed in the first short side 13*a* on the first pressure chamber 15*a* side, the second short side 13*b*, or the second long side 14*b*. The hole 19 may be formed in each of two or more different sides. The hole 19 can be used to suspend the pressure bag in which the bag-shaped container 50 is housed. When the hole 19 is formed in the first short side 13*a* as in the embodiment described above, the bag-shaped container 50 housed in the housing chamber 10 does not fall due to gravity. When the hole 19 is formed in the second short side 13*b*, the squeezing of the liquid substance out of the bag-shaped container 50 can be facilitated by utilizing the gravity. Even when the opening 11 is facing downward while the pressure chamber 15 is inflated, the possibility of the bag-shaped container 50 coming out of the housing chamber 10 is low. The protruding portion 18 that protrudes from one side of the pressure bag does not necessarily need to be provided to form the hole 19. The hole 19 may be simply formed in, for example, the joining region 41 or 42 that extends along the sides of the pressure bag. As the position of the hole 19, the hole 19 does not necessarily need to be formed in the middle of one side (13*a*, 13*b*, or 14*b*) of the substantially rectangular shape of the pressure bag 1 in the lengthwise direction thereof, and may be formed at, for example, an end portion of one side (13*a*, 13*b*, or 14*b*) of the substantially rectangular shape (or in other words, a corner of the substantially rectangular shape) of the pressure bag 1. The pressure bag according to the present invention does not necessarily need to include the hole 19.

At least one of the inner sheet 20 and the outer sheet 30 may be formed by combining a plurality of sheet pieces. For example, the outer sheet 30 may be composed of two outer sheet pieces that are separated from each other at a position corresponding to the folding-back portion 31.

The method for laminating and joining a plurality of sheets is not limited to heat sealing, and any method can be used as long as the plurality of sheets can be joined to each other in an airtight (or liquid-tight) manner. For example, the plurality of sheets can be joined to each other using a method in which an adhesive or a pressure-sensitive adhesive tape (double-sided pressure-sensitive adhesive tape or single-sided pressure-sensitive adhesive tape) is used, a fusion-bonding method, a method in which the plurality of sheets are sewed together with a thread, a combination of these methods, or the like.

The configuration of the squeezing device equipped with the pressure bag according to the present invention is not limited to the embodiment given above (see FIG. 1), either. For example, the squeezing device 100 described above includes a three-way stopcock 105 for switching between the air pump 110 and the outside so as to be brought into communication with the pressure chamber 15 of the pressure bag 1. However, the three-way stopcock 105 may be replaced by a different member. For example, instead of the three-way stopcock 105, it is possible to use a connector tool composed of a first connector and a second connector that are capable of being connected to each other and separated from each other. The first connector is provided in the first tube 101, and the second connector is provided in the second tube 102. In a state in which the first connector is connected to the second connector, air is supplied to the pressure bag 1 using the air pump 110 to inflate the pressure bag 1. After that, by separating the first connector from the second connector, the pressure in the pressure chamber 15 can be released to the outside via the first connector. The first connector may include a one-way valve configured to allow air to flow into the pressure chamber 15 and inhibit air to flow from the pressure chamber 15 toward the outside. In this case, the pressure in the pressure chamber 15 cannot be released to the outside by simply separating the first connector from the second connector. Accordingly, after the first connector has been separated from the second connector, an operation for opening the one-way valve may be performed to release the pressure in the pressure chamber 15 to the outside.

INDUSTRIAL APPLICABILITY

Although there is no limitation on the field of application of the present invention, the present invention can be favorably used as a pressure bag for squeezing a liquid substance (in particular, semi-solid low-fluidity fluid substance) contained in a bag-shaped container out of the bag-shaped container. The present invention can be favorably used in the medical field, in particular, for enteral nutrition therapy in which a semi-solid nutritional agent is injected into a patient via a catheter inserted into the body of the patient. However, the present invention is not limited to the medical field, and can also be extensively used in various fields (for example, the fields of food, general industry, and the like) in which it is necessary to squeeze a liquid substance.

DESCRIPTION OF REFERENCE NUMERALS

1 Pressure bag
10 Housing chamber
13*a* First short side
13*b* Second short side
14*a* First long side
14*b* Second long side
15 Pressure chamber
15*a* First pressure chamber
15*b* Second pressure chamber
17 Communicating tube
19 Hole
20 Inner sheet
21 Folding-back portion of inner sheet
30 Outer sheet
31 Folding-back portion of outer sheet
41 Inner sheet-to-outer sheet joining region
42 Outer sheet-to-outer sheet joining region
50 Bag-shaped container
100 Squeezing device
W Width of joining regions
L Length in long-side direction of pressure bag

The invention claimed is:

1. A pressure bag comprising a hermetically-sealed pressure chamber and a housing chamber for housing a bag-shaped container in which a liquid substance is contained, and being configured such that when a fluid is injected into the pressure chamber, the pressure chamber is inflated and applies pressure to the bag-shaped container housed in the housing chamber, and thus the liquid substance can be squeezed out of the bag-shaped container, wherein the pressure bag has a substantially rectangular shape in a plan view, and the substantially rectangular shape has opposed first and second long sides and opposed first and second short sides that are shorter than the first and second long sides, the pressure bag has a bag-like shape with an opening through which the bag-shaped container is placed into and taken out of the housing chamber in the first short side of the substantially rectangular shape, the pressure bag has a double structure in which a flexible inner sheet and a flexible outer sheet are laid one on top of another so that the outer sheet is located on an opposite side of the inner sheet from the housing chamber, the pressure chamber is provided between the inner sheet and the outer sheet, all of the inner sheet, the outer sheet, and the pressure chamber between the inner sheet and the outer sheet extend from one side to another side of the housing chamber via the first long side of the substantially rectangular shape, an inner sheet-to-outer sheet joining region in which the inner sheet and the outer sheet are laid one on top of the other and joined to each other is provided along the first short side, the second long side, and the second short side of the substantially rectangular shape, an outer sheet-to-outer sheet joining region in which two layers of the outer sheet are laid one on top of another and joined to each other is provided along the second long side and the second short side of the substantially rectangular shape, and in the second long side and the second short side, the outer sheet-to-outer sheet joining region is disposed on an outer side of the inner sheet-to-outer sheet joining region.

2. The pressure bag according to claim 1, wherein the pressure bag does not include a four-layer joining region in which two layers of the inner sheet and two layers of the outer sheet are laid one on top of another and joined to each other.

3. The pressure bag according to claim 1, wherein a joining region in which two or more layers of at least one of the inner sheet and the outer sheet are laid one on top of another and joined to each other is provided along a second short side of the substantially rectangular shape, and the joining region has a width that is 8% or more of a length in a long side direction of the pressure bag.

4. The pressure bag according to claim 1, further comprising a communicating tube that is in communication with the pressure chamber.

5. The pressure bag according to claim 4, wherein the pressure chamber includes a first pressure chamber that is located on one side of the housing chamber and a second pressure chamber that is located on another side of the housing chamber, and the communicating tube is provided to be in communication with the first pressure chamber.

6. The pressure bag according to claim 1, wherein the outer sheet has an amount of tensile deformation smaller in a long side direction than in a short side direction of the substantially rectangular shape.

7. The pressure bag according to claim 1, wherein each of the inner sheet and the outer sheet is formed of a single continuous sheet.

8. The pressure bag according to claim 1, wherein the inner sheet is folded at a folding-back portion, and the folding-back portion of the inner sheet is disposed on a side corresponding to the first long side of the substantially rectangular shape.

9. The pressure bag according to claim 1, wherein the outer sheet is folded at a folding-back portion, and the folding-back portion of the outer sheet is disposed on a side corresponding to the first long side of the substantially rectangular shape.

10. The pressure bag according to claim 1, wherein all of outer peripheral ends of the inner sheet are jointed to the outer sheet.

11. The pressure bag according to claim 1, wherein the inner sheet and the outer sheet are not joined to each other along the first long side of the substantially rectangular shape.

12. The pressure bag according to claim 1, wherein the inner sheet constitutes an inner surface of the housing chamber, and the outer sheet constitutes an outer surface of the pressure bag.

13. The pressure bag according to claim 1, wherein a hole is formed in one short side or both short sides of the substantially rectangular shape such that the pressure bag can be suspended with either one of the short sides of the substantially rectangular shape being located on an upper side.

* * * * *